Patented May 9, 1939

2,157,876

UNITED STATES PATENT OFFICE 2,157,876

POLYAZO DYESTUFFS

Hermann Winkeler, Ludwigshafen-on-the-Rhine, and Albert Petz, Mannheim, Germany, assignors to General Aniline Works, Inc., New York, N. Y., a corporation of Delaware No Drawing. Application August 31, 1938, Serial No. 227,848. In Germany February 20, 1937

5 Claims. (Cl. 260—167)

The present invention relates to polyazo dyestuffs.

We have found that valuable polyazo dyestuffs are obtained by treating disazo dyestuffs of the formula:

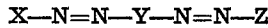
X—N=N—Y—N=N—Z (in which X is the radicle of a benzoylamino salicylic acid, Y is the residue of an aromatic radicle component and Z is the radicle of an aromatic amino compound coupled in para-position to the amino group) with phosgene, the initial materials being so selected that the final dyestuff contains at least two sulphonic acid groups.

The preparation of the azo dyestuffs may be effected for example by diazotizing an aminobenzoylamino salicylic acid, as for example meta- or para-aminobenzoyl- ortho'- or para'- aminosalicylic acid, meta- or para-aminobenzoyl-or-tho'- or para'-aminocrestinic acid, or their sulphonic acid derivatives, and coupling with an amino compound capable of coupling, as for example meta-toluidine, 1-amino-2-methoxy-5-methylbenzene, aminohydroquinone-dimethyl ether, 1-naphthylamine, 1-amino-2-naphthol ethers, 1-aminonaphthalene-6- or -7-sulphonic acid or 1-amino-2-naphthol-ether-6-sulphonic acids.

The aminoazo dyestuffs thus prepared are diazotized and coupled with aromatic amino compounds, capable of coupling in para-position to the amino group, as for example metatoluidine, 1-amino-2-methoxy-5-methylbenzene or aminohydroquinone-dimethyl ether, the resulting amino disazo dyestuffs being treated with phosgene in alkaline solution.

The new azo dyestuffs are substantive and dye vegetable fibres or regenerated cellulose usually red to violet-brown shades. They are also suitable, if desired in admixture with acid wool dyestuffs, for dyeing mixed fabrics of wool and vegetable fibres or regenerated cellulose, the dyeings preferably being aftertreated with metal salts, as for example copper or chromic salt solutions.

The following example will further illustrate how our said invention may be carried out in practice, but the invention is not restricted to this example. The parts are by weight.

Example 325 parts of 3-aminobenzoyl-1'-amino-3'-carboxy-4'-hydroxybenzene-5'-sulfonic acid are dissolved in dilute caustic soda lye. 69 parts of sodium nitrite are added, and the whole is allowed to flow into dilute hydrochloric acid at 20° C. A neutral solution of 1-aminonaphthalene-7-sulfonic acid is added and coupling is completed by the addition of sodium acetate. The resulting monoazo dyestuff is dissolved in dilute caustic soda solution, 69 parts of sodium nitrite are added thereto and hydrochloric acid is allowed to flow in at 10° C. The diazo solution obtained has added thereto a weakly hydrochloric acid solution of 137 parts of 1-amino-2-methoxy-5-methylbenzene. Coupling is completed by the addition of sodium acetate. Hydrochloric acid is now added to the solution until its reaction is weakly acid. The disazo dyestuff precipitates; it is filtered and pressed off.

The dyestuff is again dissolved in dilute caustic soda lye, treated with phosgene at 30° C. until aminodisazo dyestuff can no longer be detected, care being taken by the addition of sodium carbonate, that the reaction solution always remains alkaline. The tetrakisazo dyestuff formed precipitates in the course of the phosgenation; it is filtered off and worked up as usual.

It dyes cotton or viscose artificial silk very fast red brown shades, the fastness to washing of which may be improved by aftertreatment with copper or chromic salts.

The dyestuff is also suitable for dyeing mixed fabrics of wool and cellulosic fibres because it dyes the cellulosic portion well also from weak acid baths.

Similar dyestuffs are obtained when using as diazo component 3-aminobenzoyl-1'-amino-3'-carboxy-4'-hydroxybenzene-5'-sulfonic acid, and as second coupling component 1-amino-3-methylbenzene.

What we claim is:

1. Tetrakisazo dyestuffs corresponding to the general formula

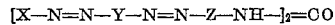
[X—N=N—Y—N=N—Z—NH—]₂=CO containing at least two sulfonic acid groups wherein X stands for the radicle of a benzoyl-aminosalicylic acid, wherein Y stands for the residue of an aromatic middle component selected from the benzene and naphthalene series and wherein Z—NH— stands for the radicle of a monocyclic amino compound of the benzene series coupled in para-position to the NH-group shown.

2. Tetrakisazo dyestuffs corresponding to the general formula

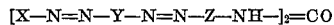
[X—N=N—Y—N=N—Z—NH—]₂=CO wherein X stands for the radicle of a benzoyl-aminosulfosalicylic acid, wherein Y stands for the residue of an aromatic middle component selected from the benzene and naphthalene series, and wherein Z—NH— stands for the radicle of a monocyclic amino compound of the benzene series coupled in para-position to the NH-group shown.

3. Tetrakisazo dyestuffs corresponding to the general formula

[X—N=N—Y—N=N—Z—NH—]$_2$=CO wherein X stands for the radicle of a benzoyl-aminosulfosalicylic acid, wherein Y stands for a naphthalene residue attached to the azo groups shown in 1- and 4-position, and wherein Z—NH— stands for the radicle of a monocyclic amino compound of the benzene series coupled in para-position to the NH-group shown.

4. Tetrakisazo dyestuffs corresponding to the general formula

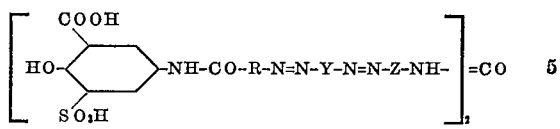

wherein R stands for a phenylene radicle, wherein Y stands for a naphthalene residue attached to the azo groups shown in 1- and 4-position, and wherein Z—NH— stands for the radicle of a monocyclic amino compound of the benzene series coupled in para-position to the NH-group shown.

5. The tetrakisazo dyestuff

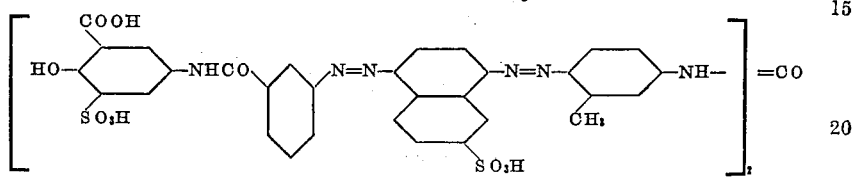

HERMANN WINKELER.
ALBERT PETZ.